INVENTOR
EDWIN K. STODOLA
BY William D. Hall
ATTORNEY

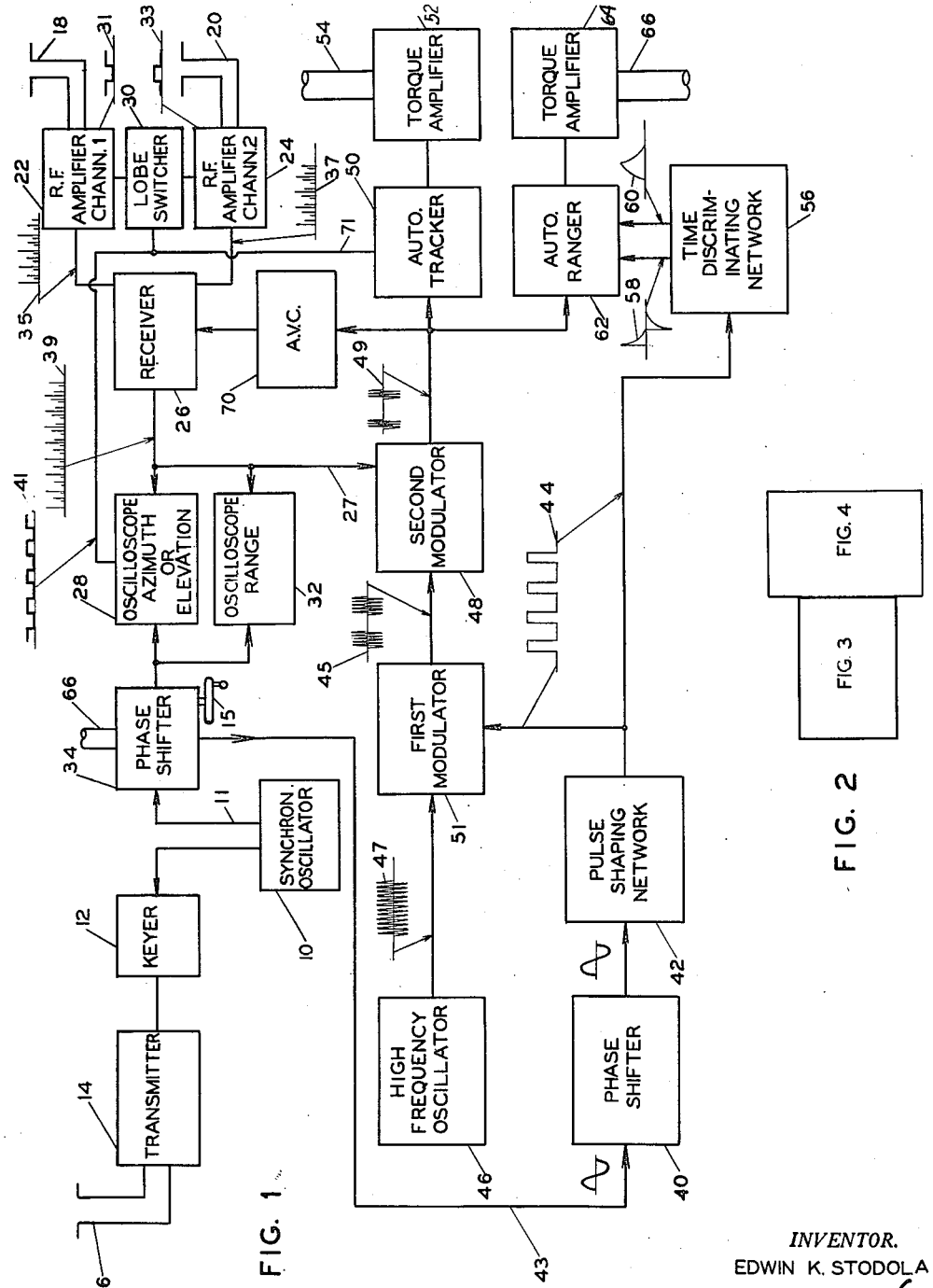

Oct. 21, 1952      E. K. STODOLA      2,615,158
RADIO OBJECT LOCATING SYSTEM
Filed May 1, 1943      5 Sheets-Sheet 3
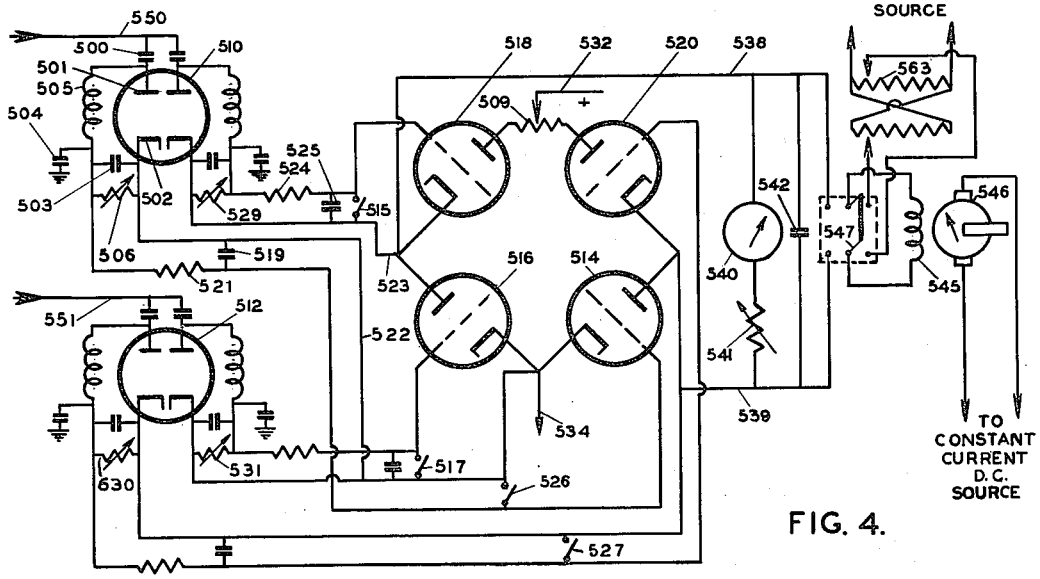
FIG. 4.
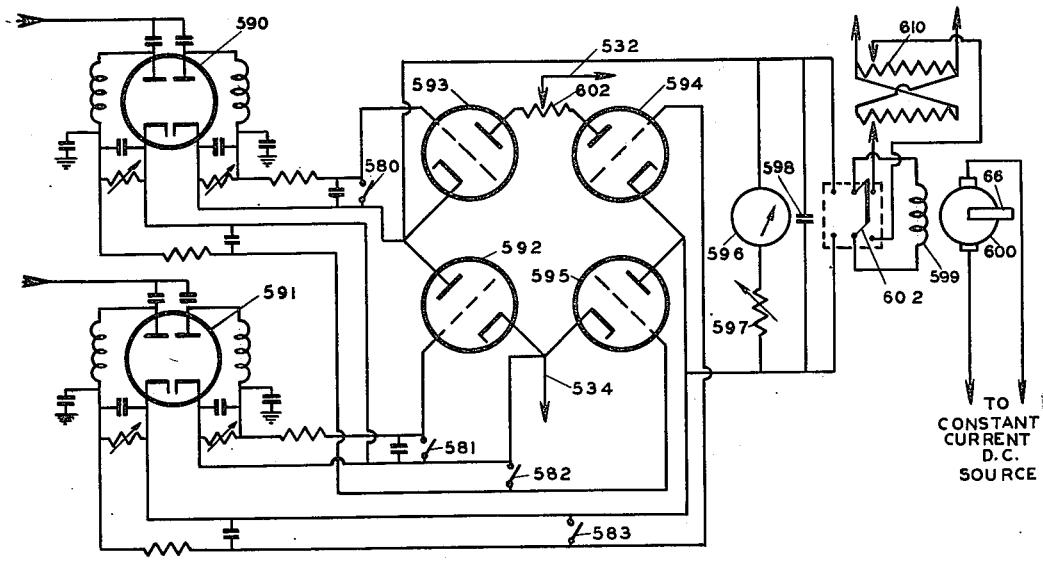
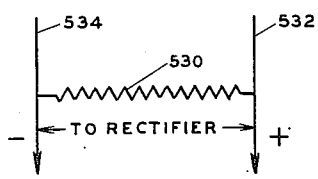
*INVENTOR*
EDWIN K. STODOLA
BY *William D. Hall.*
*ATTORNEY*

Oct. 21, 1952     E. K. STODOLA     2,615,158
RADIO OBJECT LOCATING SYSTEM
Filed May 1, 1943     5 Sheets-Sheet 4
RANGE OSCILLOSCOPE SCREEN
FIG. 5A 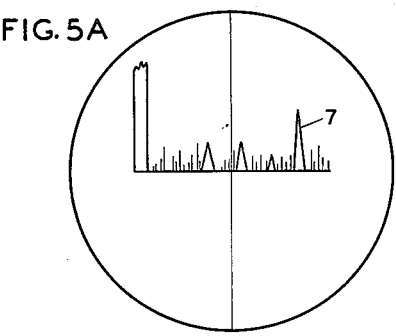 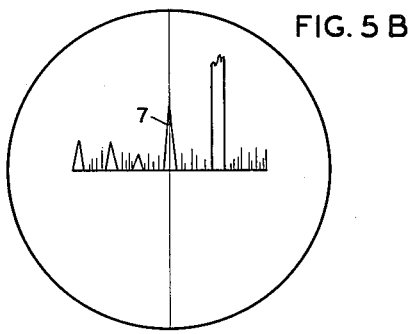 FIG. 5B
AZIMUTH OR ELEVATION OSCILLOSCOPE SCREEN
FIG. 6A 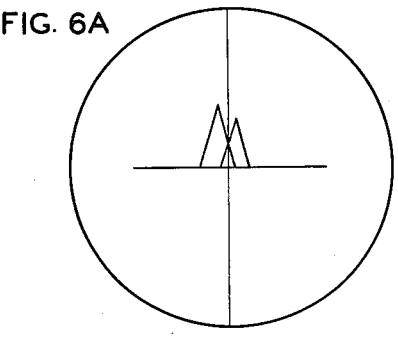 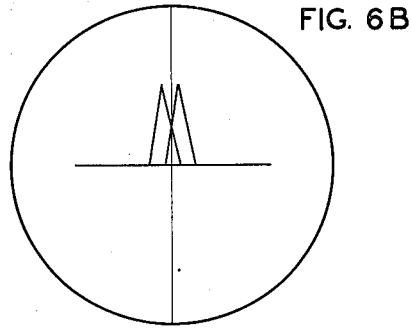 FIG. 6B
FIG. 10          FIG. 11
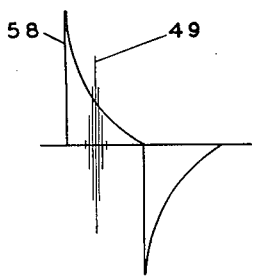 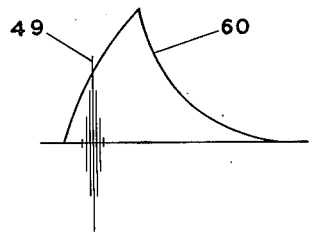
INVENTOR.
EDWIN K. STODOLA
BY William D. Hall
Attorney.

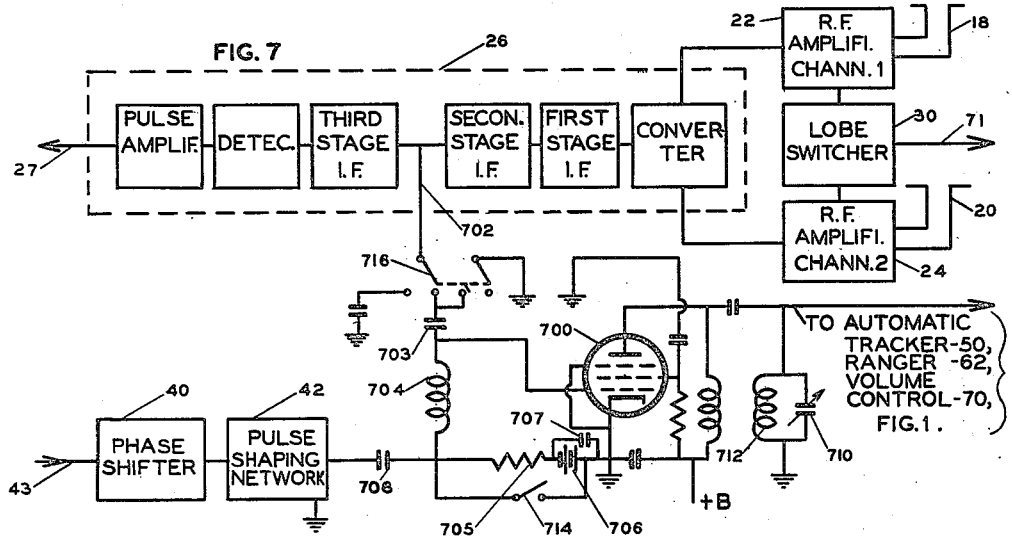
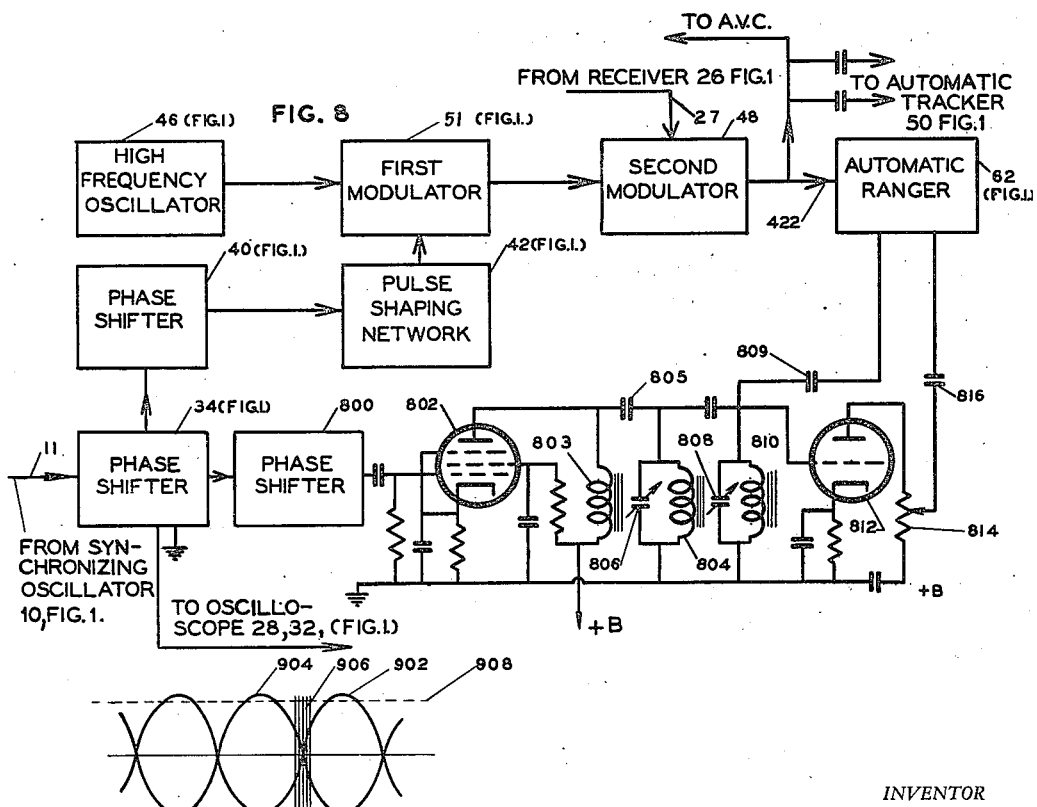

Patented Oct. 21, 1952

2,615,158

UNITED STATES PATENT OFFICE 2,615,158

RADIO OBJECT LOCATING SYSTEM

Edwin K. Stodola, Neptune, N. J., assignor to the United States of America as represented by the Secretary of War Application May 1, 1943, Serial No. 485,372

5 Claims. (Cl. 343—7)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio pulse-echo object-locating systems, and more particularly to the systems for automatically tracking with elevation and azimuth antenna arrays a single echo-producing object, and for simultaneous automatic range determination for the same single object.

In the systems of this type, a pulse of radio-frequency energy is radiated by a highly directional antenna. If the transmitted waves strike an object capable of reradiating these waves, they will be reradiated in part, back to their source by this object. This echo pulse on its return to its source has sufficient energy to produce an observable effect in a suitable receiver located in the vicinity of the original source of these pulses. Generally the effect consists of visual indications on a cathode-ray oscilloscope in a form of vertical peaks projecting upward from a horizontal base line. These visual indications, together with the positioning of the antennae, are utilized for determining the location of the object. Where the objects whose location is being determined are moving, it is necessary to adjust the positioning of the elevation and azimuth antennae in accordance with the movements of the objects, so that true indications of the elevation and azimuth of the objects may be obtained. This adjustment to give an indication of the azimuth and/or elevation of a moving object is known as tracking. Where means are provided for adjusting the azimuth antenna and/or the elevation antenna automatically in accordance with the movements of objects whose azimuth and elevation are being determined, such means is known as automatic tracking means, or automatic tracker.

It is common practice to provide such object location systems with means which may be adjusted in accordance with the range of the object whose location is being determined and which will give an indication of the range in accordance with the range adjustment. Where means are provided for performing the range adjustments automatically in accordance with variations in the range of the object such means is known as automatic ranging means or automatic ranger.

Under certain conditions a complete reliance on the data as obtained by the operators of the radio systems of this type based on manual adjustments of controls for manual tracking with elevation and azimuth antenna arrays, and manual operation of controls for determining the range unjustifiably limits the possibilities of these systems by lowering their accuracy. The vertical peaks produced by the echo signals may vary in their amplitude from one instant to another, because of the fluctuations in the intensity of the reflected signal, interference signals which may add to or subtract from the echo signals, because of variations in the transmission medium and the resulting variations in strength of the reflected pulse, and because of other causes which need not be discussed here. Moreover, the signal pattern as it actually appears on the oscilloscope screen generally includes a large number of echo signals proper as well as a multitude of pulsating signals, commonly called "noise." Another factor which must be considered relates to the illumination generally found on the oscilloscope screen. Compared with daylight, this illumination is low, and when the equipment is used in the daytime there is a very marked contrast in light intensities found on the oscilloscope screen and bright surroundings. This contrast sometimes produces a temporary blindness among operators due to quick changes from light to dark and vice versa.

All of the effects tend to tire the operators, strain their eyes, and make them non-responsive to small changes in the intensities of the echo signals on the oscilloscope screen. This, added to the normal human error which increases very rapidly under combat conditions, causes the operators to make relatively large errors in range, azimuth and elevation determinations. Since these errors, which are attributable solely to the manual operation of the system, remain fixed, no advantage is obtained by increasing the accuracy of the radio system itself because the high precision of the system itself is completely submerged in the comparatively large errors committed by the operators during manual operation of the controls. Therefore, if the increased precision of the radio system itself is to be reflected in the final data obtained with the aid of this system, the errors produced by the operators must be eliminated. The most direct method of accomplishing this result is by eliminating this source of errors altogether. This may be done by transferring some of the duties of the operators at a predetermined stage of a normal operating cycle of the radio locator to an automatic equipment the performance of which would excel the manual operation of controls by the operators, and would thus enable one to obtain that limit of accuracy which is imposed only by the system itself.

Besides the automatic operation of the controls, the operating conditions outlined above make it very desirable that the systems of this type provide, besides the oscilloscopes and their screens which are ordinarily used as means for visually reproducing the individual echo signals, some additional indicating instruments of a zero-center scale meter type which would provide an indication of the amount and direction of antennae deflections from their normal positions with respect to an echo signal selected by the operator, and an additional meter indicating the amount and direction of range reading deviation from its true value. These meters perform the function of meter tracking and meter ranging.

It is, therefore, the principal object of this invention to provide a motor driven equipment for automatic antenna tracking and automatic range following or determination of an echo signal selected by the operator.

Another object of this invention is to provide a radio-object-locating system the gain of which is controlled only by the selected echo signal.

Still another object of my invention is to provide automatic tracking and ranging or range determining systems which utilize surgeless circuits in which the auxiliary signals produce no detrimental effect on the output side of said circuits.

Still another object of this invention is to provide a new meter-tracker and a new range meter for the radio object locating systems, these meters enabling the operators to more closely follow the echo-producing object.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

Figure 1 is a block diagram of a radio-object-locating system and a block diagram of one form of the automatic tracker and ranger.

Figure 2 illustrates the relationship of the circuits of Figs. 3 and 4 with respect to each other.

Figures 3 and 4 are the schematic diagrams of the automatic tracker and ranger or range determining component of Fig. 1.

Figures 5A, 5B and 6A, 6B illustrate the signals on the screens of the range, azimuth and elevation oscilloscopes.

Figure 7 is a block diagram of a receiver, and a schematic diagram of another form of circuit for use with the automatic tracker and ranger of Figs. 3 and 4.

Figure 8 is a partly block and partly schematic diagram of still another form of circuit for use with the automatic ranger of Figs. 3 and 4.

Figures 9, 10 and 11 illustrate the phase relationship between the time-discriminating pulses and the selected echo signal in the automatic ranger of Figs. 8 and 3.

Figure 3:
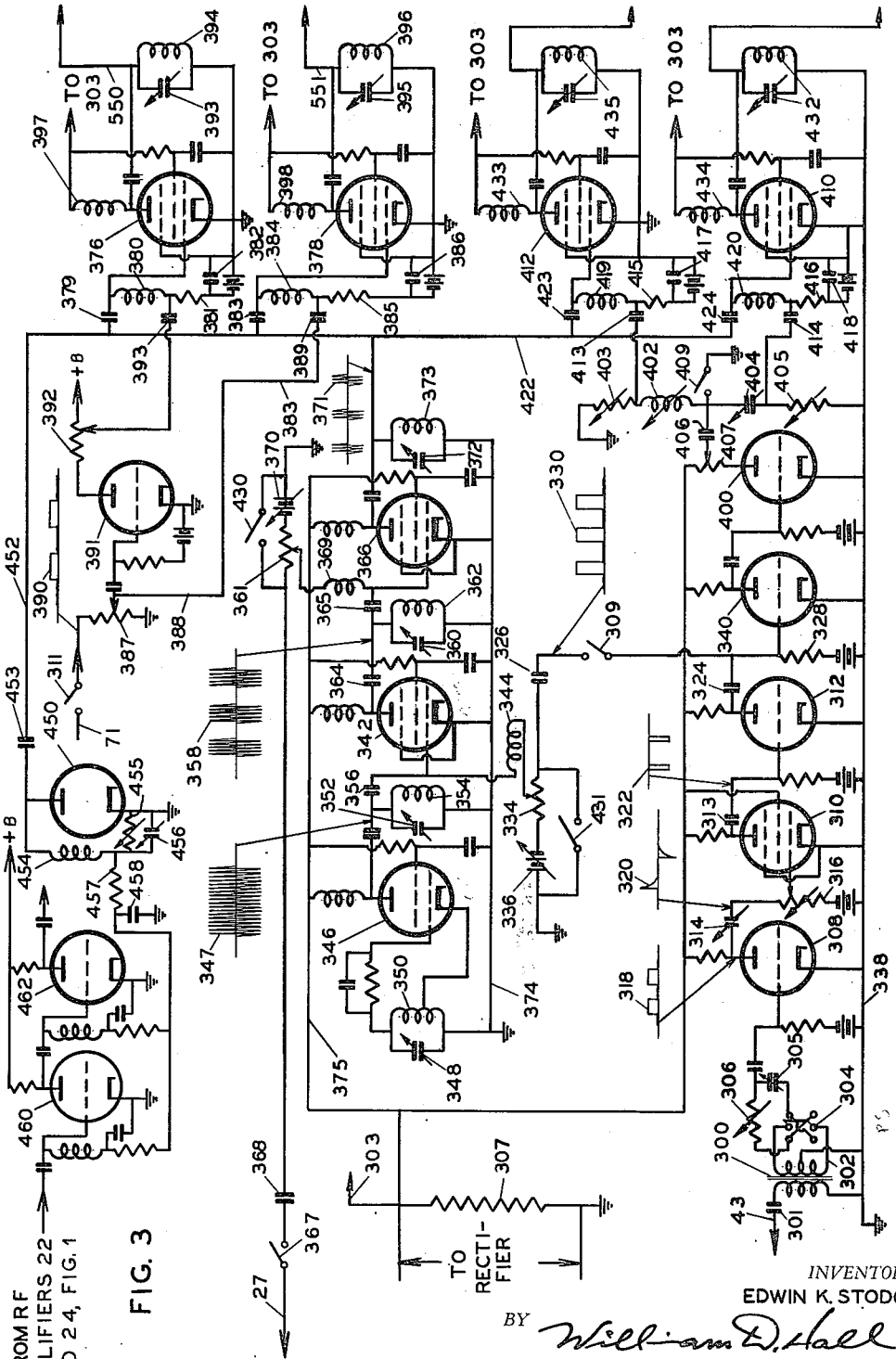

Referring to Fig. 1, a synchronizing oscillator 10 is connected to a keyer 12 which modifies the sinusoidal wave impressed upon it into a synchronous series of powerful pulses of very short duration. These pulses are used for keying a transmitter 14 which emits correspondingly short, powerful and highly directional pulses through a highly directional antenna array 16. If there are any objects within the field of antenna 16 that are capable of re-radiating the transmitted pulse, the transmitted pulse will be re-radiated by these objects, and some portion of the reradiated energy will reach an antenna array 18—20. This array has two divergent, partially overlapping highly directional reception patterns so that the reflected echo signal produces two signals of equal intensity when the mean axis of the array points directly at the object, and of unequal intensity when the plane of the array forms an angle with the plane of the incoming radio wave.

The antenna arrays of this type are known, and do not form a part of my invention; therefore, their description need not be given here. It should be stated, however, that my invention is not restricted to any particular antenna system, and will function with any type of directional antenna array which has at least two divergent, partially overlapping reception patterns capable of producing two signals of equal or unequal intensity depending upon the orientation of the array with respect to the plane of the incoming radio wave.

The object-locating system illustrated in Fig. 1 is used for determining the azimuth, elevation and range of the object; as the azimuth and the elevation channels are identical, only one of them is shown in Fig. 1. The range determining channel as a rule, has no separate antenna array, and is ordinarily connected to the azimuth channel.

The object-locating systems which employ the antenna array with two divergent, partially overlapping response lobes, and a like number of receiver input channels connected to the antenna and alternately operating to receive a series of signals from an object first through one of said channels and then through the other, and which use these channel signals to provide two adjacent visual signals which may be easily compared with respect to their relative magnitudes and thus used for the proper orientation of the system in azimuth and in elevation, are known as the double-tracking systems. This is shown in Figs. 6A and 6B where the two channel components of an echo signal produced by a single object are shown as they normally appear on the screens of the azimuth and elevation oscilloscopes.

Apparatus for the automatic tracking described in this specification is particularly adapted for use in connection with the double-tracking or multiple-tracking radio systems, while apparatus for automatic ranging is not restricted to the double-tracking systems, and may be used with any system which utilizes the lateral displacement in time of the echo signal from the transmitted signal for determining range.

A signal from one lobe of antenna is impressed on a radio frequency amplifier 22, and from the other lobe on an amplifier 24, the two amplifiers forming two parallel input channels of the receiver. The signals in these radio-frequency channels will be composed of the main transmitted pulse, one or more echo signals, and of interference signals. This is illustrated in Figs. 5A and 5B which shows a range oscilloscope screen with a typical signal pattern appearing on the screen.

As stated above, the amplitude of the echo signals in these channels may or may not be equal, and this amplitude difference is utilized as a guide for proper orientation of the azimuth and elevation antenna arrays. A typical single-echo signal pattern as it appears on the elevation or azimuth oscilloscope screens is shown in Figs. 6A and 6B. Normally all signals appearing on the screen of the range oscilloscope also appear on the oscilloscope screens of the azimuth and the elevation channels; for the sake of simplicity only one selected echo signal is shown in Figs. 6A and 6B. Figure 6A shows the echo signal when the channel components have unequal intensities, and Fig. 6B shows the same channel components when they are made equal by pointing the antenna array directly at the echo-producing object.

To produce these two independent images of the same echo signal on the screen of azimuth oscilloscope 28, the amplifiers 22 and 24 are keyed by a lobe switcher 30 which generates rectangular waves 31 and 33 of the same frequency but 180° out of phase; these waves make amplifiers 22 and 24 alternately conductive so that the output signals of the amplifiers are as shown at 35 and 37, the highest peaks indicating the transmitted pulse, and the smaller peaks indicating the echoes.

The lobe switcher frequency may be synchronized by well known means with the frequency of the synchronizing oscillator 10, and made either half or a submultiple of half the oscillator's frequency. If the lobe switcher frequency does not have any sub-multiple relationship with half the frequency of the oscillator, then it must be sufficiently removed from the frequency of the oscillator to avoid the production of undesired patterns on the oscilloscope screens. In the system shown in Fig. 1, the frequency of the lobe switcher is one-eighth of the frequency of the oscillator, since four complete channel signals are shown at 35 and 37, corresponding to each half of the lobe switcher output wave.

A receiver 26 is connected to amplifiers 22—24 on its input side and to the oscilloscopes 28 and 32 on its output side. The oscilloscope 28 may be either an azimuth or an elevation oscilloscope depending upon whether the antennae 18—20 are azimuth or elevation antennae. To avoid confusion and repetition, oscilloscope 28 will be referred to hereinafter as an azimuth oscilloscope. The signals on the output side of the receiver are shown at 39; they consist of four signals first from one R. F. channel and then the other R. F. channel. The sweep voltages of the oscilloscopes 28 and 32 are under control of the synchronizing oscillator 10. Moreover, the sweep circuit of oscilloscope 28 is also under control of a square wave 41 generated by the lobe switcher. Since the synchronizing oscillator 10 also controls keyer 12 and transmitter 14, the sweep circuits of the oscilloscope 28 and 32 are in constant synchronism with the transmitted pulses. The square wave 41 is in phase with square wave 31 and is utilized in the sweep circuit of oscilloscope 28 for lateral shifting of the cathode-ray beam in synchronism with the keying of the R. F. channels 22—24. Therefore, the signals shown at 39 appear as two laterally displaced images on the screen of the azimuth oscilloscope 28, as illustrated in Figs. 6A and 6B, the degree of lateral displacement being controlled by varying the amplitude of square wave 41.

Since range oscilloscope 32 is not connected to lobe switcher 30, its sweep circuit is controlled only by the synchronizing oscillator 10, and, as a consequence, there is no lateral displacement of the signals on its screen, but they appear as a single retraced signal when the antennae are pointed directly at the object. This is shown in Figs. 5A and 5B. When the antenna is not pointed at the object, then the two signals appear at the same place, but have different amplitudes.

The operation of the system is, briefly, as follows: Oscillator 10 controls keyer 12 in such a manner that the latter keys transmitter 14 with a constant predetermined periodicity, this periodicity being controlled by the frequency of the oscillator. Transmitter 14 emits through a highly directional antenna array 16 short periodic pulses which constitute the field exploring signals. If there is a plurality of echo-producing objects within the antennae fields, their echoes will appear on the range, azimuth, and elevation oscilloscopes as a plurality of peaked signals. To determine the distance to any one of these objects, the range oscilloscope operator revolves a hand wheel of the phase shifter 34 until the selected echo signal appears under the hair line of the range oscilloscope 32, as illustrated in Figs. 5A and 5B, where Fig. 5A illustrates the relative position of the signals with respect to the hair line before any echo signal has been selected, and Fig. 5B illustrates the same signals but with the echo signal 7 selected by the range oscilloscope operator. The phase shifter has a correctly calibrated dial which gives a range distance in miles or yards. Operation of phase shifter 34 also shifts the echo signals on the screens of the elevation and azimuth oscilloscopes, and positions the echo signal selected by the range operator in the center of the screens of these oscilloscopes, as illustrated in Figs. 6A and 6B. This at once gives notice to the azimuth and elevation operators which particular signal has been selected, and that they must properly orient their antenna with respect to that particular echo signal. If the echo signals are of different magnitude, as illustrated in Fig. 6A, the azimuth and elevation operators turn the antenna mounts either manually or through power drives so as to point their antennae directly at the object, which equalizes the amplitudes of the echo components on the oscilloscope screens, as illustrated in Fig. 6B. The azimuth and elevation angles necessary for locating the object appear on the dials connected to the antenna mounts.

The automatic tracking and ranging systems, described in the specification, replace the manual orientation of the antenna mounts with the automatic systems which follow a moving object without any manual assistance of the range, aizmuth and elevation operators.

*Operating features utilized by the automatic tracker and ranger*

To facilitate the understanding of the detailed description of several automatic tracking and ranging systems, an outline of the basic operating features employed by the systems described in this specification will be given first.

As mentioned previously in this disclosure, the azimuth and the elevation receivers utilize the same double-tracking principle. Therefore, the automatic tracking system which is suitable for the azimuth tracking is equally suitable for the automatic tracking in elevation. This being the case, a description of only one system is necessary.

In order to automatically track a single moving object, it is necessary to eliminate all other echo signals which may be within the antenna field so that only the selected echo signal, from the selected object, appears in the automatic tracker. Therefore, all automatic tracking systems outlined in this specification provide an echo selecting circuit which selects the desired echo signal, and suppresses the entire remaining antenna field, including the powerful transmitted pulse also appearing in the output of the receiver.

The second operating feature of the automatic trackers resides in the provision of a channel separating circuit whereby the channel components of the selected echo signal appear in two separate parallel channels of the tracker, these channels terminating in a differential circuit.

Finally, the automatic tracker is provided with an appropriate torque amplifying and power driven mechanism connected to the antenna array mount, which is capable of responding to the output of the differential circuit so as to automatically turn the antenna mount in the direction which equalizes the intensity of the channel components of the selected echo signal.

Automatic ranging system

Several species of the automatic ranging systems described in this specification all apply to that type of the radio-object-locating system where the range is determined by measuring the distance between the transmitted pulse and the selected echo pulse on the range oscilloscope screen by operating a phase shifter so that the selected echo pulse always appears under the hair line on the range oscilloscope screen when the range apparatus is set to measure the range distance to the echo producing object. Since the determination of the range distance depends on the measurement of the time consumed for the transmitted signal to reach the object and for the echo signal to return to either the azimuth or the elevation antenna arrays, and it does not depend upon the difference in the intensities of the channel components of the echo signal, the apparatus necessary for the automatic ranging of necessity takes a different form as compared to the apparatus required for automatic tracking. Irrespective of the species of the automatic ranging systems disclosed in this specification, they all use the following features:

As in the case of the automatic tracking system, there is an echo selecting circuit which selects the desired echo signal, and eliminates all other signals that may be present in the field scanned by the antenna array. Generally, the echo selecting circuit which is used for selecting the desired echo signal for the automatic tracker may also be used for the automatic ranger.

However, since the function that must be assigned to the automatic ranging circuit resides in the fact that it must keep the selected echo signal constantly under the cross hair line on the screen of the range oscilloscope, the automatic ranger input circuit at this stage must assume a different form than the same circuit for the automatic tracker.

The automatic ranger provides two parallel channels and a means for producing a signal either in one or the other channel when the selected echo signal begins to drift either in one or the other direction on the range oscilloscope screen. To obtain this result the automatic ranger provides a time-discriminating signal for each channel having a fixed phase relationship with respect to the output of the range unit. When the range unit follows the object, the two parallel channels of the automatic ranger are equally conductive. When the selected echo signal begins to drift to the left or to the right with respect to the time-discriminating signals, which happens when the object changes its range position, then one channel is rendered more conductive, and another channel is rendered less conductive. The specification discloses several species of invention for accomplishing this result.

The remaining elements of the automatic ranger have a form similar to the corresponding elements in the automatic tracker, i. e., the outputs of the two parallel channels are connected to an appropriate differential circuit, the output of which is connected to a motor driven system used for rotating the phase shifter in such a manner as to keep the selected echo signal constantly under the cross hair line of the range oscilloscope.

Besides the equipment outlined above, operation of the radio object-locating system itself as well as the operation of the automatic tracker and ranger may be considerably enhanced by providing special automatic volume control circuit which is under control of only the selected echo signal. Since at any given time, only the amplitude of the selected echo signal is of prime importance, the automatic volume control for the entire system should be governed only by the selected echo signal, and all other echo signals, interference signals, and especially the powerful transmitted pulse, must have no effect on the automatic volume control. Moreover, since the variation in the intensity of the selected echo signal is apt to lower the precision and stability of the automatic systems, optimum operating characteristics of the automatic systems may be obtained when only the intensity of the selected signal is capable of controlling the automatic volume control circuit. The specification discloses the A. V. C. circuit, the functioning of which conforms with the above mentioned characteristics.

Some of the miscellaneous switches which may be used for timely connecting, disconnecting and calibration of the automatic tracker and ranger are illustrated in the accompanying figures. Also illustrated are the appropriate meters for indicating the position of the selected echo signal with respect to the range, azimuth and elevation channels of the radio system. Since the sensitivity of these meter circuits is more readily controllable by damping than the sensitivity of the cathode-ray oscilloscopes, these meters enable the operators to follow a fast moving target more closely than the oscilloscopes.

The protective equipment, such as overload relays, restoring relays, etc., which are ordinarily used in connection with the systems of this type, are not shown, since they are well known in the art, and, therefore, need not burden this disclosure.

Referring to Fig. 1, the automatic tracker and automatic ranger equipment are shown connected to the double-tracking system previously described. Synchronizing oscillator 10 is connected through phase shifter 34 to a second phase shifter 40, the latter being used for co-phasing of the automatic tracker and ranger with receiver 26. The sinusoidal wave generated by synchronizing oscillator 10 is thus impressed in proper phase relationship on a pulse-shaping network 42, which transforms it into a rectangular wave shown at 44. The duration of each rectangular element of this wave is longer than the duration of each individual echo pulse. The rectangular pulses 44 render first modulator 51 conductive to high frequency 47 impressed upon it by a high frequency oscillator 46. A series of high frequency waves, illustrated at 45, appearing in the output of first modulator 51 are impressed on a second modulator 48, where they are used to select the desired echo signal and simultaneously convert it into a high frequency signal illustrated at 49. The selected echo signal is impressed on an automatic tracker 50, which is also connected to lobe switcher 30. Here the channel components of the selected echo signal are separated, and, since the same lobe switcher is used for switching the radio-frequency amplifiers 22—24 as well as for switching of the parallel channels in tracker 50, the separation of the channel components of the echo signal in the automatic tracker is always in strict synchronism with the switching of the R. F. channels in the receiver. After the separation of the channel components of the echo signal, they are rectified and impressed as a D. C. potential on a vacuum tube Wheatstone bridge circuit, the output of which is used in a torque amplifier 52 mechanically connected to the antenna mount (not shown) through a shaft 54. Shaft 54 turns antenna 18—20 mount so that the antenna array points at the selected target.

The rectangular pulse 44 produced by the pulse-shaping network 42, besides being impressed on first modulator 51 is also impressed on a time-discriminating network 56, which generates two pulses illustrated at 58 and 60. An automatic ranger 62 has two parallel channels, and echo signal 49 is impressed on both channels, whereas pulse 58 is impressed on one channel, and pulse 60 on the other. This is illustrated in Figs. 10 and 11, Fig. 10 illustrating the phase relationship between the time-discriminating pulse 58 and the echo pulse 49 when the system is "on range," and Fig. 11 illustrates the same phase relationship between the pulses 60 and 49. The electronic tubes in the parallel channels of the automatic ranger remain equally conductive as long as the phase relationship between the signals impressed upon them remains as illustrated in Figs. 10 and 11. However, when the echo signal displaces itself laterally with respect to pulses 58 and 60, a larger portion of the echo signal gets through one channel, and a smaller portion of the same signal gets through the other channel. This produces a differential D. C. potential in the output of a Wheatstone bridge which is used for exciting the field of a D. C. motor of a torque amplifier 64. The latter is mechanically connected through a shaft 66 to phase shifter 34, which results in the adjustment of the position of the phase shifter so as to keep the selected echo signal under the cross hair line on the range oscilloscope.

In order to obtain more accurate indications of the position of the selected object on the screens of the oscilloscopes, and in order to accomplish more precise following of the same object by the automatic equipment just described, the output of the second modulator 48, besides being connected to automatic tracker 50 and automatic ranger 60, is also connected to an automatic volume control 70 which is used for regulating the bias potential of the intermediate frequency stages of receiver 10 by means of the selected echo signal.

*Description of the schematic diagram, Figs. 3 and 4*

The relationship of Figs. 3 and 4 is illustrated in Fig. 2. Referring now to Figs. 3 and 4, they show a schematic diagram of the automatic tracker and ranger. The grouping of the elements in those figures is as follows: Tubes 308, 310 and 312 located in the lower left corner of Fig. 3 are used for generating the echo selecting pulse. Tubes 340 and 400 are used for producing the two time-discriminating pulses used in the automatic ranger for fixing the phase of the selected echo pulse with respect to the former. Three vacuum tubes 346, 342, 366 which are positioned immediately above the lower channel in Fig. 3 represents a high-frequency oscillator and two modulator tubes which automatically select the desired echo pulse from the output of the receiver and transforms it into a higher frequency pulse, conductor 27 being connected to the receiver 26, Fig. 1.

Tubes 460 and 462 in the upper left corner of Fig. 3 are the intermediate frequency stages of receiver 26 illustrated in Fig. 1 which are connected to an automatic volume control tube 450 controlling the gain of the receiver.

Conductor 71 appearing in the upper central portion of Fig. 3 and tube 391 connected to this conductor are used for connecting lobe switcher 30, Fig. 1, to automatic tracker 50, and it represents that part of the automatic tracker circuit which furnishes the square waves for separating the channel components of the echo signal.

The automatic tracker itself is composed of eight vacuum tubes, tubes 376 and 378 of which are illustrated in the upper right corner of Fig. 3, and tubes 510, 512, 514, 516, 518 and 520 are illustrated in the upper half of Fig. 4. Tubes 376 and 378 receive only the selected echo signal, and since they are keyed by a lobe switcher, channel No. 1 components appear in tube 378, while channel No. 2 components appear in tube 376. The remaining tubes illustrated in Fig. 4 compare the amplitude of the channel components and impress a current of one polarity or the other on a D. C. motor 546 which turns antenna 18—20 mount so as to make the channel signals equal.

The schematic diagram of the automatic ranger is shown in the lower right corner in Fig. 3, and the lower portion of Fig. 4, tubes 410 and 412 receive only the selected echo pulse over conductor 422, and the time-discriminating pulses produced in the output of a tube 400 over condensers 413 and 414. The remaining portion of the schematic diagram of automatic ranger is identical with the same portion of the schematic for the automatic tracker; it consists of the rectifier tubes 590, 591, Fig. 4, a bridge circuit, tubes 592-3-4-5, and a field winding 599 of a torque amplifier 600, shaft 66 of which is connected to phase shifter 34, Fig. 1.

Referring now once more to Fig. 3, and proceeding with a more detailed description of the circuits, conductor 43 which connects phase shifter 34 to phase shifter 40, Fig. 1 is shown in the lower left corner of Fig. 3. The phase shifter comprises a double-pole, double-throw switch 304, the outer terminals of which are connected to a variable resistor 306, and a variable condenser 305. The middle terminals of switch 304 are connected to a transformer 300 with a grounded center tap on a secondary 302, and a grounded primary, the ungrounded end being connected to conductor 43 through a coupling condenser 301. The sinusoidal wave output of the phase shifter is transformed into a series of rectangular pulses shown at 330 by the overdriven amplifiers 308, 310, and 312. The output of amplifier 308 is connected to a variable condenser-resistance differentiating network 314—316 which differentiates the output of amplifier 308 illustrated at 318, and transforms it into a wave form illustrated at 320. This differentiated wave is impressed on a high gain overdriven amplifier 310, which amplifies only the lower part of the positive pulse illustrated at 320, and modifies it into a negative rectangular pulse illustrated at 322. These negative pulses are impressed on the grid of the inverter tube 312, through a coupling condenser 313 where they are further amplified and appear in the output circuit of this tube as a positive rectangular pulse illustrated at 330. The ouput of tube 312 is coupled to two circuits; one circuit impresses the rectangular pulses on the grid of a tube 340 through a grid resistor 328, and is subsequently used for producing the time-discriminating pulses for the automatic ranger. The other circuit is the plate of tube 312, coupling condenser 324, switch 309 isolating condenser 326, grid resistor 334, grounded biasing battery 336, and grounded conductor 338 connected to the cathode of tube 312. This circuit impresses the periodic rectangular wave 330 on the control grid of a grid modulator tube 342 through a high frequency choke coil 344. This grid is also connected to a high frequency oscillator tube 346 so that tube 342 operates as a grid modulator keyed "on" and "off" by the rectangular wave 330. High frequency oscillator 346 as shown in the figure is of an electron coupled type with a tuned grid circuit 348—350, and a tuned plate circuit 352—354, any other type of oscillator circuit may be used for the purpose at hand. Oscillator 346 is coupled to the control grid of tube 342 through a condenser 356, and shunting of high frequency illustrated at 347 to ground is prevented by a choke coil 344 which is connected between the grid and the grounded resistor 334. Tube 342 is normally blocked by the biasing battery 336 so that the signal from oscillator 346 can not get through this tube. However, the rectangular wave 330 which is periodically impressed on this grid renders this tube conductive for the duration of the rectangular pulse, the duration of which is made equal to approximately twice or thrice the duration of an average echo signal. A series of high-frequency pulses as they appear in the plate circuit of tube 342 are illustrated at 358. The periodicity of these pulses is the same as the periodicity of a single echo pulse. These pulses are impressed on a tuned circuit 360—362 through a coupling condenser 364, the tuned circuit being in turn coupled through a condenser 365 to the control grid of a second grid modulator 366. This grid is also connected over conductor 27, Figs. 1 and 3, switch 367, isolating condenser 368, and choke coil 369 to the output of receiver 10, Fig. 1, so that this grid, besides receiving periodic high-frequency pulses from modulator 342, also receives the entire output of the receiver. This output, as mentioned previously, is composed of the transmitted pulse and plurality of echo pulses if there are several echo producing objects in the field scanned by the antenna lobe. Grid modulator tube 366 is normally blocked by a biasing battery 370 so that no signals impressed on this tube by the receiver appear in its output unless they coincide with the high-frequency pulses impressed on the control grid. The echo signal overcomes the blocking potential, and when this is the case, grid modulator 366 is rendered conductive for the duration of the echo signal, and a high frequency signal appears in the output circuit of this tube as illustrated at 371. From this it follows that, since the periodic high frequency pulse 358 impressed on the control grid of modulator 366 is not capable of rendering this tube conductive by itself, even if the duration of the individual high-frequency pulse 358 may be longer than the duration of the selected echo pulses, the high frequency pulse 371 that appears in the tuned output circuit 372—373 is of that duration which is equal only to the duration of the selected echo pulse, the remaining portion of the high-frequency pulse 358 being suppressed.

Referring for a moment again to Fig. 1, one may recall the fact that a single synchronizing oscillator 10 is used for keying the transmitter 14 as well as for timing the operation of the receivers oscilloscopes 28—32. Since the output of this oscillator is also used for keying modulator 342 and for producing the radio-frequency pulses illustrated at 358, these pulses are in constant synchronism with the selected echo pulse, and any operation of phase shifter 34, Fig. 1, will shift the rectangular wave 330 used for selecting the desired echo signal. The remaining connections of the oscillator 346, modulators 342 and 366 are conventional and need only a brief mention. All cathodes are connected to a grounded conductor 374, the screen grids of the modulators 342, 366 and oscillator 346 are grounded by by-pass condensers and are connected to conductor 375 which connects the screen grids and the plates of these tubes to the positive side of bleeder resistor 307. The plate circuits of the above mentioned tubes are connected to the positive source of potential through high-frequency chokes.

*Automatic antenna tracker*

The selected echo signal 371 is impressed in parallel on the control grids of pentodes 376 and 378. The high-frequency input circuit of pentode 376 is: grounded conductor 374, tuned circuit 372—373, condenser 379, choke coil 380, grid resistor 381, and grounded condenser 382. A similar circuit is provided for tube 378, consisting of condenser 383, high-frequency choke coil 384, grid resistor 385, and grounded condenser 386.

As previously mentioned in connection with the description of the operation of the double-tracking system, the selected echo pulse consists of an alternate series of signals from two antenna lobes. For comparison, the two series of signals must be separated in an appropriate manner. This separation takes place in tubes 376 and 378. The control grids of these tubes, besides being connected to the source of the selected echo signal 371, are connected to the lobe switcher 30, Fig. 1, over conductor 71, Figs. 1 and 3, and a grounded potentiometer 387. The rectangular wave generated by lobe switcher 30 is illustrated at 390. The control grid of the tube 378 is connected to potentiometer 387 over a conductor 388, and a coupling condenser 389. Since the rectangular wave 390 originates in the lobe switcher 30, it will have the same periodicity as the square waves 31—33, Fig. 1, generated by the same lobe switcher, and used for switching the receiver's input circuit. Tube 376 is connected to potentiometer 387 through a phase inverter tube 391 coupled to potentiometer 387. The output of this tube appears at a potentiometer 392, and is impressed on the control grid of tube 376 through a coupling condenser 393. Tubes 376—378 are normally blocked by the biasing potentials, and the echo signal 371 can get through these tubes only when the blocking potential is overcome by the rectangular wave 390. Therefore, tubes 376 and 378 are rendered alternately conductive only when the channel components of the selected echo pulse and the positive periods of the square waves are impressed simultaneously on their control grids. This separates the channel components of the echo signal so that the components of one channel appear as a series of high frequency signals in a tuned circuit 393—394 of tube 376, whereas the components of the other channel appear as a series of high frequency signals in a tuned circuit 395—396 of tube 378. The frequency waves as a result of switching of tubes 376, 378, if they appear in the output circuits at all, which normally is not the case, are shunted to ground over the tuned circuits choke coils 394 and 396, and in part over the choke coils 397 and 398, the latter connecting the plates of tubes 376 and 378 to a bleeder resistor 307 over conductor 303. Accordingly, the square wave 390 and its inverted form cannot appear in twin rectifier diodes 510 and 512, Fig. 4, connected to the tuned circuits over conductors 550 and 551 respectively. This results in a surgeless switching of the parallel channels.

The circuit of the positive half cycle of the high frequency signal impressed on the left side of diode 510 is as follows: tank circuit 393—394, condenser 500, plate 501, cathode 502, condenser 503, grounded condenser 504, and ground connected to the cathode of tube 376. The D. C. connection between plate 501 and cathode 502 is through a high frequency choke coil 505 and a variable resistor 506. The charge that is accumulated on condenser 503 because of the space current is governed by the variable resistance 506, it is proportional to the peak voltage of the channel components of the selected echo signal. The right half of this rectifier has a circuit which is identical in all respect to the circuit of the left half just described. The output of the left half of rectifier 510, which appears across resistance 506 represents the input circuit of triode 514, the grid of which is connected to one side of resistance 506 through a resistance 521, while its cathode is connected to the other side of resistance 506 through a conductor 522. Resistance-condenser combination 521—519 act as an additional filtering means for the signal impressed on tube 514. The right side of rectifier 510 is connected in a similar manner to a triode 518 over a conductor 523 and a resistance 524, which, in combination with a condenser 525, form a filter circuit.

The circuits of a twin rectifier 512 are in all respects identical to the circuits of twin rectifier 510, and, therefore, need no additional description. Suffice it to say that the output of the left side of the rectifier represents the input circuit of a triode 520, while the output of the right side of the rectifier represents the input circuit of a triode 516. Triodes 514, 516, 518, 520, form a bridge circuit, triodes 514 and 518 being connected to the output of one twin rectifier, while triodes 516 and 520 are connected to the output of the other twin rectifier. The plates of triodes 518 and 520 are connected to the positive end of a source of potential illustrated as a bleeder resistor 530 by conductor 532, whereas the cathodes of triodes 514 and 516 are connected to a negative side of bleeder resistor 530 over conductor 534. The plates of triodes 514 and 516 are connected to the cathodes of triodes 518 and 520 respectively. The output of this bridge is connected to the left-hand poles of a double-pole, double-throw switch 547 by conductors 538 and 539. A meter 540, a variable resistance 541, and a condenser 542 are also connected across the output of the bridge. The middle poles of the double-throw switch are connected to a field winding 545 of a reversible direct current motor 546, which is connected to a source of direct current potential. The righthand poles of the double-throw switch 537 are connected to a potentiometer arrangement 563, which is also connected to a source of direct current potential.

Reverting once more to that part of the circuit in Fig. 3 which is used for generating the echo-selecting pulse 330, and particularly to tube 312, it has been stated previously that its output is impressed on two parallel circuits, one of them being the input of grid modulator 342, while the other is the input circuit of triode 340. This triode represents the beginning of that circuit which is used for producing the time-discriminating pulses shown in Figs. 10 and 11. Tube 340 acts as an overdriven amplifier and an inverter for the positive rectangular pulse 330 impressed upon it. The negative rectangular voltage pulse appearing in the output of tube 340 is impressed on the second overdriven amplifier 400, the output of which is a positive rectangular voltage pulse impressed through a potentiometer 407 and a condenser 406 on the time-discriminating networks composed of two parallel branches: one branch is composed of a grounded and adjustable inductance-resistance combination 402—403, while the other branch is composed of an adjustable condenser-resistance combination 404—405 grounded over conductor 338. The junction point between the networks is connected to a grounded switch 409 which, when closed, shunts the output of tube 400 to ground. The rectangular pulse impressed on the inductive branch of the network is transformed into a pulse 60 shown in Fig. 11, while in the capacitive branch of the circuit it is differentiated and transformed into two pulses shown at 58, in Fig. 10. The phase relationship between pulses 58, 60 and the selected echo signal is also illustrated in Figs. 10 and 11, the selected echo pulse appearing at 49 in both figures. Since the elements forming the time-discriminating networks are adjustable, the shape of the pulses 58 and 60 may be varied, changing the slopes of the curves indicated in the Figs. 10 and 11.

The pulses generated by the time-discriminating networks are impressed on the control grids of pentodes 410, 412 through coupling condensers 413, 414, grid resistors 415, 416, and condensers 417, 418. The actual coupling between the grid resistors and the control grids is through choke coils 419 and 420 which are used as high impedance elements for connecting the same grids to the selected echo pulse 371 which is also impressed on the control grids over a conductor 422, and coupling condensers 423 and 424. The circuit to ground is completed through the previously mentioned choke coils 419, 420, grid resistors 415, 416 and grounded condensers 417, 418. The control grid of pentode 412 is, therefore, under the influence of the pulse produced by the inductive time differentiating network 402—403 and the selected echo signal, while the control grid of pentode 410 is under the influence of the pulse generated by the capacitive time differentiating network 404—405 and the selected echo signal. The phase relationship indicated between those signals in Figs. 10 and 11 illustrates that instant when the selected echo signal appears directly under the cross hair line of the range oscilloscope as shown in Fig. 5B. At this instant a high frequency signal of equal intensity appears across tuned circuits 435 and 432, and as long as the intensities of these signals are equal, the currents carried by the comparison circuits connected to the tuned circuits 435 and 432 balance each other, and no current flows through a field winding 599 of a torque amplifier 600. The adjustment of this circuit is described in columns 19 and 20, lines 57-75 and 1-14, respectively, of this specification.

The remaining elements of the two parallel channels in the automatic ranger are identical to the corresponding elements in the automatic tracker, and for that reason need no detailed description. It may be stated for the sake of completeness that the output of pentodes 410 and 412 are connected to twin rectifiers 590, 591, Fig. 4, which control the four branches of the bridge circuit formed by triodes 592, 593, 594 and 595. As in the case of the automatic tracker, the meter circuit 596, 597, a filter condenser 598, and a field winding 599 are all connected across the output of the bridge. The field winding 599 forms a part of a torque amplifier unit illustrated as a direct current reversible motor 600 connected to a source of direct current. Shaft 66, Figs. 1 and 4, of this motor is connected to phase shifter 34, Fig. 1, and, by revolving in one direction or the other, it adjusts an appropriate element in the phase shifter, such as a gang condenser, so as to keep the selected echo pulse constantly centered on the screen of the range oscilloscope.

Automatic volume control

In the introductory part of this specification it has been stated that the reflected echo signals have, as a rule, a fluctuating amplitude from one instant to the other which may be due to the changes in the position of the echo producing object, variations in the reflecting area and directivity, interference signals which may add to or subtract from the echo signals, variations in the transmission medium, and other causes. Since the persistence of vision of the operators which operate the systems by observing the images on the oscilloscope screen do not necessarily notice all of these rapid fluctuations in the amplitude of the reflected signals, the overall performance of the system when manually operated may still be fair even if there are intermittent variations in the intensity of illumination and amplitude of the reflected signals. However, when these signals are impressed on the circuits used for automatic tracking and ranging, the precision of which depends completely on the amplitude of these signals, it becomes a matter of first importance that the receiver is provided with some positive means for controlling the amplitude of these particular signals in the receiver.

The amplitude variations may be so pronounced that the normal, actually existing differences between the channel components of any given echo signal may be completely obliterated in the receiver because of its momentary saturation by the signals of both channels. When this takes place, then the automatic tracker and ranger may become temporarily inoperative. The parasitic signals of this type would obviously reduce the precision of the tracker and ranger.

An additional factor which must be considered in devising the amplitude control resides in the fact that the range, azimuth, and elevation oscilloscope operators and the automatic tracker and ranger must faithfully follow only that signal which has been selected on the screen of the range oscilloscope by its operator, and disregard completely all other signals that may be present within the antenna field. Since the signals impressed on the receiver hardly ever have identical amplitudes and the fluctuations of these amplitudes are, as a rule, different, little would be gained if one were to follow the known systems for automatic volume control, since such systems depend on the effects that are produced on the volume control circuits by all signals impressed on the receiver. The inadequacy of the known A. V. C. systems is especially true if they were to be applied to the radio object-locating systems, since these systems besides receiving very weak echo signals also receive a very powerful transmitted pulse. Since the transmitting antenna and the receiving antenna are next to each other, the transmitted pulse is bound to saturate the receiver. Because of the extreme power of the transmitted signal, the automatic volume control system in this instance must not be subjected to the influence of the transmitted signal, but instead should be under control of the selected echo signal only.

One additional requirement which must be satisfied by the automatic volume control system which would be suitable for the purpose at hand, is that its constants must be such as to act as an overall amplitude control, for the selected echo signal. The time constant of its circuit must be equal to the duration of several intervals of the channel signals, i. e., it must not act as a levelling device for the normal difference in the intensities of the channel signals. By way of example rather than any limitation, if the period of operation of each channel is equal to time T, then the time constant of the automatic volume control should be $T \times N$, where N is in the order of 10.

The automatic volume control system illustrated in the upper left hand corner of Fig. 3 satisfies all of the above mentioned requirements. It comprises a rectifier diode 450, the output of which controls the biasing potentials impressed on the intermediate frequency stages of receiver 26, Fig. 1, illustrated in a schematic form in part in Fig. 3 as amplifier tubes 460 and 462. Only two stages are shown for the purpose of illustration, but it is obvious that the operating features may apply to any number of stages which may be actually used in the receiver.

Proceeding now with a detailed description of the circuit of the automatic volume control, it is connected to the output of modulator 366 over conductor 452 and a coupling condenser 453. It may be recalled that modulator 366 reproduces in its output circuit the selected echo signal as periodic high-frequency signals. These are impressed on an A. V. C. diode circuit comprising a diode 450, which rectifies the positive half of the signals, a high-frequency choke coil 454 and an adjustable resistance-condenser combination 455—456. From the connections shown it is apparent that the grid potentials on the intermediate frequency tubes depend on the potential existing across condenser 456. Resistance 457, condenser 458 are used as an additional means for stabilizing the grid potential impressed on the intermediate stages. The connections of the intermediate frequency stages are of a conventional type, and, therefore, need no description.

From the description of the A. V. C. circuit just given, it follows that it regulates the receiver's gain by means of the selected echo signal only, the remaining signals including the transmitted signal, having no effect on the control circuit.

*Adjustment of the automatic tracker and ranger.*—Transmitter 14 and receiver 26 are started and put in operation. Switch 367, Fig. 3, is closed, and the automatic system is adjusted as described below.

*Rectangular pulse 330.*—This adjustment relates to the determination of the height and the width of the rectangular pulse 330. Pulse 330 must overcome the normal blocking potential impressed on the grid of the modulator 342. With the oscillator 346 signal adjusted to the desired value, switch 309 is opened and bias potential 334 is adjusted until the high frequency signal disappears on the screen of an oscilloscope, the deflection plates of which are connected between condensers 364, 365 on one side and ground on the other side. Switch 309 is then closed and the potentiometer arm setting on resistor 334 adjusted to produce a signal of the intensity desired on the control grid of the second modulator 366.

The width of pulse 330 is adjusted so that it is in the order of twice or thrice the width of an average echo signal. The reason for making pulse 330 wider than any echo signal resides in the fact that the automatic ranger may sometimes momentarily lag the movement of the selected echo. When this is the case, pulse 330 should be wider than the selected echo to avoid losing of the selected echo at the second modulator 366. It may be recalled that the selected echo and pulse 330 occur simultaneously as long as phase shifter 34 follows the movement of the echo. If phase shifter 34 at any time begins to lag the selected echo, then, to prevent its immediate loss at modulator 366, pulse 330 must be made wider than the width of the echo signal.

The adjustment of the width of the echo selecting pulse 330 is as follows: With switch 431 open, switch 309 closed, and the oscilloscope deflection plates still connected between condensers 364, 365 and ground, the width of pulse 330 is varied by varying resistance-condenser combination 314, 316 until the high frequency pulse appearing on the oscilloscope screen is approximately five or six times the known width of an echo signal. In order to adjust the width of the echo-selecting pulse 330 more accurately, it must be repeated once more after completion of a cophasing adjustment described hereinafter. With the cophasing adjustment accomplished, the deflection plates of an oscilloscope are connected between conductor 422 and ground, and with switch 367 closed and the gain control of receiver 26 turned to a normal setting, its output is impressed on the control grid of modulator 366. Phase shifter 34, Fig. 1, is then adjusted so that the transmitted pulse appears in the center of the range oscilloscope screen and the potentiometer arm on resistance 361 and battery 370 are so adjusted that the transmitted pulse as well as the high frequency pulse from modulator 342 get through the second modulator 366. With this accomplished, the width of pulse 330 is varied by varying resistance condenser-combination 314—316 until the high frequency pulse of approximately two or three times the width of the transmitted pulse. Blocking potential on the second modulator 366 is then adjusted by increasing it until that part of the high frequency signal which does not coincide with the transmitted pulse disappears on the oscilloscope screen.

Since the subsequent circuit of the echo selector, which primarily involves grid modulator 366, as mentioned above, is so biased that normally only the selected echo signal appears in its output irrespective of the width of the high-frequency pulse impressed on its control grid, the adjustment of the width of the rectangular pulse 330 is not a critical adjustment, and it is made in the order of thrice the width of an average echo signal as a matter of precaution and assurance that the automatic ranger will not lose the selected echo pulse, irrespective of its width, or the speed of its movement.

*Square wave 390.*—Potentiometers 387, 392 and the biasing potentials impressed on the control grids of pentodes 376 and 378 are adjusted to make these pentodes conductive for the high frequency signals impressed on their control grids when the rectangular waves are "on" and fully blocked when the rectangular waves are "off." This may be accomplished by connecting the deflection plates of an oscilloscope or a voltmeter, first between conductor 550 and ground, and by adjusting the biasing potentials and the amplitude of the rectangular waves so that the high frequency signal of desired intensity appears on the oscilloscope screen when switch 311 is closed, and disappears when switch 311 is opened.

*Balancing of the bridge circuits.*—The bridge circuits in the automatic tracker and automatic ranger are balanced by varying the settings of the potentiometer resistors 509 and 602 so that the meters 540 and 596 read zero when the switches 515, 517, 526, 527, 580, 581, 582 and 583 are closed. After balancing of the bridge circuits, the above switches are opened.

*Balancing of the resistors in the rectifier circuits in the automatic tracker.*—With switches 309 and 367 open, and switches 430 and 431 closed, a steady high-frequency signal is impressed on the automatic tracker channel, and resistors 506, 529, 630 and 531 are adjusted so that meter 540 reads zero. The same adjustment may be checked once more for the individual resistors by closing switches 515, 517, 526, and 527 one at a time, and by observing the degree of unbalance produced by each of the four stages of twin rectifiers 510 and 512. With the resistances properly adjusted, meter 540 reading must have the same deviation in each case.

*Cophasing of the automatic system.*—This adjustment is concerned with the cophasing of the automatic equipment with the receiver channel. Circuits in the receiver and in the automatic equipment introduce different phase shifts, and these must be nullified by properly adjusting phase shifter 306—305 so that the echo selecting pulse 358 and the echo signal selected by the operator of the range oscilloscope appear simultaneously on the control grid of pentode 366. To this end phase shifter 34, Fig. 1, is adjusted so that the transmitted pulse is under the cross hair line on all three oscilloscopes, i. e., range, elevation and azimuth oscilloscopes 28—32, Fig. 1. With the the switches 367, 309, 515 and 526 closed, and the receiver gain turned down far enough to eliminate all but the transmitted pulse from the receiver's output, the phasing resistor 306, or condenser 305, or both, are adjusted so as to give the maximum deflection on meter 540.

When this is so, the transmitted signal will be in phase with the echo selecting pulse 358 impressed on modulator 366, since the entire transmitted signal can get through modulator 366 only when there is a complete phase coincidence between the high frequency echo selecting signal 366 and the transmitted signal. During this adjustment, it may be found that no proper phase relationship can be obtained by adjusting resistor 306. If this happens, it means that the automatic equipment is so much out of phase with the transmitted pulse, that it cannot be brought into phase with this pulse by the adjustment of phase shifter 306—305. In this case, phase reversing switch 304 must be operated in order to obtain the desired phase shift, and, after the operation of this switch, resistor-condenser combination 306—305 is again employed to obtain the necessary cophasing of the circuits. With the cophasing adjustment accomplished, switches 515 and 526 are opened again, and the gain in the receiver restored to its normal level. It may be recalled that in the previous adjustment of the width of the echo-selecting pulse 330 its width has been made twice the width of the transmitted pulse. After preliminary cophasing of the circuits, the width of this pulse should be made equal to the width of the transmitted pulse, and the cophasing adjustment repeated again to obtain a more precise cophasing of the systems. With this accomplished, the width of pulse 330 is widened again to its previous width.

*Balancing of the rectifier circuits in the automatic ranger.*—This adjustment is accomplished in exactly the same manner as the same adjustment already described for the automatic tracker circuit, except that when this adjustment is made in the automatic ranger, it is necessary to close switch 409 which grounds the output of triode 400 so that the time discriminating pulses generated by the time discriminating networks 402—405 are not impressed on the control grids of pentodes 410 and 412. The biasing potentials impressed on the control grids of tetrodes 410 and 412 are lowered and a high frequency signal of equal intensity is impressed on both channels of the automatic ranger by oscillator 346. This is accomplished by closing switches 430 and 431, and opening switches 367 and 309. The variable resistors connected in the outputs of the rectifiers are then adjusted so that meter 596 reads zero, with switches 580, 581, 582, and 583 open, and with meter 596 giving the same deflection when one of the aforementioned switches is closed one switch at a time.

*Adjustment of the time discriminating networks.*—The aim of this adjustment is to obtain an equal sensitivity on both channels of the automatic ranger when the selected echo signal changes its normal phase position with respect to the time-discriminating signals. The transmitted signal is selected on the range oscilloscope by adjusting phase shifter 34, and is impressed on the control grids of pentodes 410—412. With the networks 402—403 and 404—405 properly adjusted, and proper biasing potential impressed on the control grids, this signal should not produce any reading on meter 596. If it does, the networks and the biasing potentials are adjusted until the meter is restored to its normal zero position. After this preliminary adjustment, phase shifter 34, is turned through equal angles, first in one direction, and then the other, so as to shift the transmitted signal on the range oscilloscope screen from its normal, under the hair-line, position an equal distance, first to the left, and then to the right of the cross hair-line. If the transfers of the impressed signal through the channels including the pentodes 410 and 412 are equal, then the symmetrical shifts of the transmitted signal will produce equal readings on meter 596. If this is not the case, then the grid potentials and the networks are adjusted by varying bias potentials, resistances 403—405, condenser 404 and inductance 402 so as to obtain equal response in meter 596 when the transmitted pulse is oscillated through equal angles back and forth by phase shifter 34.

*Adjustment of the field rheostat for direct current motor.*—When the range operator decides to choose any particular echo signal on the range oscilloscope screen, it would be necessary for him to pass some of the echo signals under the cross hair-line of the range oscilloscope. Since neither the azimuth nor the elevation antennae are ordinarily properly oriented with respect to these echo signals, the automatic driving equipment should be disconnected during that period when the range operator selects the desired echo signal to avoid the imposition of needless stresses on the automatic systems. However, the motor driven equipment may be used for the preliminary orientation of the antenna mounts, as well as for operating phase shifter, if the operators resort to the use of the self-centering rheostats 563 and 610, Fig. 4. These rheostats in their normal position are so connected that when the switches 547 and 602 are operated to connect them to the field windings 545 and 599, no potential is impressed on the windings. To obtain this result, the rheostats, while being connected to the field windings, are centered by adjusting the tension of the centering springs (not shown) until the direct current motors remain stationary.

*Operation of the automatic antenna tracker and automatic ranger*

With the double-pole, double-throw switches 547 and 602 in their neutral position, the transmitter-receiver combination illustrated in Fig. 1 is put in operation. The operator of the range oscilloscope must now select the desired echo signal on the screen of the range oscilloscope. He may accomplish this by operating phase shifter 34 by revolving hand-wheel 15, Fig. 1, or he may resort to the use of the power equipment by operating switch 602 to its right position which connects field winding 599 to rheostat 610. He then operates the hand-wheel (not shown) of the rheostat in the desired direction which starts motor 600, and the latter turns a condenser or any other appropriate element in phase shifter 28 through shaft 66, the resulting shift in phase of the sinusoidal voltage generated by the synchronizing oscillator 10 positioning the selected echo signal under the cross hair line on the range, azimuth and elevation oscilloscopes. After selecting the echo signal, the range operator may operate the double-throw switch 602 to its left position, transferring control over phase shifter 34 to the automatic ranger, which will from now on keep the selected echo signal properly centered on the range oscilloscope.

The operation of the automatic tracker will be given first, and it will be followed by the description of the operation of the automatic ranger.

The automatic tracker operates as follows: A sinusoidal wave generated by synchronizing oscillator 10, Fig. 1, is impressed over conductor 43, Figs. 1 and 3, on phase shifter 305—306. The echo selecting pulse generator 308—310—312 transforms the sinusoidal wave of the synchronizing oscillator into a series of rectangular pulses 330 of approximately thrice the width of an echo signal. The rectangular pulses 330 are impressed on the normally blocked first grid modulator 342, rendering it conductive for the high-frequency impressed upon it by oscillator 346. The automatic system is cophased with the receiver so that the periodic high frequency signal impressed on the control grid of the second grid modulator 366 appears on it simultaneously with the selected echo signal also impressed on this grid by receiver 10 over conductor 367. The echo signal overcomes the blocking potential of the second modulator 366, and a high-frequency signal gets through the second modulator 366. The high-frequency signal is impressed in parallel on the control grids of the pentodes 376 and 378, the positive rectangular waves also impressed on the control grids of the pentodes from lobe switcher 30, Fig. 1, over conductor 71 alternately unblock them so that channel #1 components of the selected echo are amplified by pentode 378, and channel #2 components are amplified by pentode 376. In this manner the channel components of the selected echo signal are separated and again appear in two separate, parallel channels. The outputs of pentodes 376 and 378 are impressed on twin rectifiers 510 and 512 where the positive halves of the components are rectified, integrated and impressed as varying negative D. C. potentials on the grids of triodes 514, 516, 518, and 520 forming a bridge circuit. Here the amplitudes of the channel component signals are compared, and when they are equal, no current flows through field winding 545 and meter 540, both of which are connected across the bridge. When the amplitudes are unequal, then the bridge circuit becomes unbalanced, and a direct current of one polarity or the other flows through winding 545 and meter 540. The created field flux starts reversible-direct current motor 546, which turns the antenna mount so as to equalize the amplitude of the channel components, and thus point the antenna array directly at target. Since meter 540 is also connected across the bridge circuit, it indicates the magnitude and the direction of deviation of the antenna array from its on target position.

Reverting now to the operation of the automatic ranger, the rectangular wave 330 after passing through phase reversing tube 340 and inverter 400, is impressed on two parallel time-discriminating networks 402—403 and 404—405, which produce two signals, shown in Figs. 10 and 11, signal 58 leading and signal 60 lagging the selected echo pulse 49. These signals are impressed, together with the selected echo signal coming from modulator 366, on the control grids of pentodes 410—412. Pentodes 410 and 412 form the input stages of the two parallel channels of the automatic ranger. They are adjusted to produce two equal high frequency signals in their tuned output circuits 430 and 435 when the selected echo is in the center position on the screen of the range oscilloscope. The time-discriminating signals used for changing the transconductance of pentodes 410 and 412 do not appear in the tuned circuits because they are shunted to ground over the coils of the tuned circuits 435, 432 and to some extent over the high frequency choke coils 433 and 434.

When the echo signal changes its range, there is a corresponding change in the phase relationship between the time-discriminating signals and the echo signal with the resulting increase in the high frequency signal transmitted by one tube, and a decrease in the same signal transmitted by the other tube. The outputs of tubes 410 and 412 are impressed on twin rectifiers 590 and 591 respectively, where they are rectified, integrated and appear as direct current signals on the grids of triodes 592—3—4—5. These four triodes are connected as a bridge circuit, the output of which is impressed on meter 596 and field coil winding 599 of direct current motor 600. Shaft 66, Figs. 4 and 1, of motor 600, turns the appropriate elements in phase shifter 34, Fig. 1, in such a direction as to constantly keep the selected echo signal under the cross hair line on the screen of the range oscilloscope. The automatic ranger may be disconnected at any time by operating double-pole, double-throw switch 602.

Meter 596, which is also connected across the bridge circuit, indicates the degree and the direction of deviation of the selected echo signal from its central position on the screen of the range oscilloscope.

After the range operator has selected the desired echo on the range oscilloscope, the operators of the azimuth and elevation antennae, may properly orient the antenna either by using the automatic equipment or by using rheostat 563. After the approximate orientation has been completed, the double-pole, double-throw switch 547 is operated to the left, and the automatic tracker from then on will track automatically.

*Automatic tracker and ranger using intermediate frequency of the receiver*

Figure 7 shows a modification of the system shown in Figs. 1 and 3. In Figs. 1 and 3, the high frequency oscillator 46, Fig. 1, and 346, Fig. 3, is used for supplying the high frequency for converting the audio frequency selected echo pulse into a high frequency pulse. This conversion takes place in the second modulator illustrated at 48 in Fig. 1 and at 366 in Fig. 3. In Fig. 7, the high frequency oscillator 346 and the first modulator stage 342 shown in Fig. 3 have been eliminated, and the tube performing the function of the second modulator 366 has been connected on one side between the intermediate frequency stages of receiver 26, and to the echo selecting pulse-shaping network 42, Figs. 1 and 7, on the other side. It is thus possible to eliminate the high frequency oscillator since the input into a modulator 700, Fig. 7, from receiver 26 is now a high frequency signal.

Referring now to Fig. 7 more in detail, the elements performing the same function in Figs. 1 and 7 bear the same numerals. Thus, Fig. 7 illustrates the two antenna arrays 18 and 20, the two R. F. amplifiers 22 and 24, lobe switcher 30 and receiver 26, which are also shown in Fig. 1. Receiver 26 is shown more in detail in Fig. 7, a converter, three intermediate frequency stages, a detector and a pulse amplifier being shown in a block form within the dotted line which corresponds to the outline of receiver 26 shown in Fig. 1. A conductor 702 is connected between the second and the third intermediate frequency stages of receiver 26, which impresses the receiver's signals on the control grid of modulator 700 through a switch 716 and a coupling condenser 703, the circuit to ground being completed through a high frequency choke coil 704, a grid resistor 705, and a condenser 707. Biasing battery 706 normally blocks modulator 700 to all signals impressed upon it by receiver 26. The echo selecting pulse channel in Fig. 7 is identical with the same channel in Figs. 1 and 3, and therefore, its elements in Fig. 7 bear the same numerals as the corresponding elements in Figs 1 and 3. Conductor 43 connecting phase shifter 34 to phase shifter 40 and pulse shaping network 42 are also shown in Fig. 7. As in the case of Figs. 1 and 3, the rectangular pulse that appears in the output of the pulse shaping network 42, shown as pulse 44 in Fig. 1, and pulse 330 in Fig. 2, is used in Fig. 7 for selecting the desired echo signal; it is impressed on a coupling condenser 708, resistance 705 and grounded condenser 707, to overcome the blocking potential impressed by battery 706, so that if at this instant an intermediate frequency pulse is simultaneously impressed on the control grid of modulator 700, it renders it conductive for the intermediate frequency signal. The intermediate frequency signal is reproduced in an amplified form in a tuned circuit 710—712, which in its function corresponds to the tuned circuit 372—373 in Fig. 3. It is connected to the automatic tracker 50, automatic ranger 62, and automatic volume control 70 shown in Figs. 1 and 3. Switches 714 and 716, Fig. 7, perform the same function as switches 431 and 367 in Fig. 3 respectively. The advantages of the system shown in Fig. 7 resides in the fact that it eliminates the local high frequency oscillator.

*Modification of the time-discriminating network*

Figure 8 shows a schematic diagram of a modification of the time-discriminating circuit for the automatic ranger. In order to correlate Fig. 8 with Fig. 1 some of the circuit elements shown in Fig. 1 are also shown in Fig. 8 and bear the same numerals in Fig. 8 as the corresponding elements in Fig. 1. Conductor 11 which connects the synchronizing oscillator 10 to phase shifter 34, is shown in the lower left corner of Fig. 8. The upper part of the block diagram in Fig. 8 showing phase shifter 40, pulse shaping network 42, high frequency oscillator 46, modulators 51, 48, and automatic ranger 62 are identical with the same elements shown in Fig. 1. Therefore, the high frequency oscillator channel, the echo selecting channel, the automatic tracker, the automatic ranger, and the volume control circuits are identical in Figs. 1 and 8, and the modification resides only in the time-discriminating circuit which is used for producing two time-discriminating signals in the parallel channels of the automatic ranger for keeping the selected echo signal properly centered on the screen of the range oscilloscope.

Referring now to this circuit, it begins with a phase shifter 800 which is connected to phase shifter 34 on one side, and, to a linear amplifier 802 on the other side. This additional phase shifter is used for cophasing the echo signal with the time-discriminating signals. Amplifier 802 has in its output circuit an audio frequency choke coil 803 coupled through a condenser 805, to an inductance-condenser combination 804, 806, tuned to one of the harmonic frequencies of the sinusoidal wave impressed on amplifier 802 by phase shifter 34. Therefore, amplifier 802, in combination with the tuned circuit, acts as a frequency multiplier, the output of which is impressed on a second inductance-condenser combination 808, 810 also tuned to the selected harmonic, the two tuned circuits acting as a bandpass filter for the selected harmonic. The output of this filter is impressed on one of the parallel channels of the automatic ranger 62, through a coupling condenser 809 which corresponds in its function to the coupling condenser 413 shown in the lower right corner of Fig. 3. In this case, condenser 809 is used for impressing a sinusoidal wave on the control grid of pentode 412, Fig. 3, in the upper channel of the automatic ranger. The network 808, 810 is also connected to a phase inverter tube 812 which impresses the harmonic frequency on the control grid of pentode 410, Fig. 3, in the lower channel of the automatic ranger through a potentiometer 814 and a coupling condenser 816, this condenser corresponding to condenser 414 shown in Fig. 3. From the description of the connections shown in Fig. 8, it follows that the control grid of the first pentode 412, Fig. 3, is connected to one harmonic wave, while the control grid of the second pentode 410, Fig. 3, is connected to the same harmonic, but 180° out of phase with the harmonic impressed on the first pentode. The selected echo signal is also impressed on the control grids of the pentodes over conductor 422, Figs. 8 and 3, and the phase relationship which exists between the harmonic frequencies and the selected echo signal is shown in Fig. 9. Thus, the harmonic frequency is used in the case of Fig. 8 for producing the time-discriminating signals for the automatic ranger.

Referring to Fig. 9, the sinusoidal wave 902 represents a harmonic of the sinusoidal wave generated by synchronizing oscillator 10, Fig. 1. This harmonic is impressed on one channel of the automatic ranger while harmonic 904 is impressed on the other channel. Phase shifter 800 is so adjusted that the selected echo signal, illustrated at 906 intersects the zero line when there is a reversal of polarity in the sinusoidal waves. The magnitudes or the biasing potentials impressed on the control grids of pentodes 412, 410, Fig. 3, are indicated in Fig. 9 by a dotted line 908, which shows that only a portion of the selected echo signal and of the harmonic frequency impressed on the control grids of the pentodes render these tubes conductive. As in connection with Fig. 3, the time-discriminating pulse, which is the harmonic frequency in this case, is shunted to ground in the output circuits of pentodes 410, 412 over high frequency choke coils 433 and 434, while the high frequency echo signal will appear in the tuned circuits 435 and 432. Therefore, as long as the phase relationship shown in Fig. 9 persists, both channels retain their state of equal conductivity. However, if the selected echo signal shifts either to the left or to the right of the position illustrated in Fig. 9, the high frequency signal in the output of one pentode will be increased, and the output of the same signal in the other pentode decreased. The resulting unbalance is used in the automatic ranger 62 for restoring and maintaining the phase relationship illustrated in Fig. 9.

The advantage of this type of the time-discriminating signals resides in the fact that they have a sinusoidal form, and, therefore, are symmetrical in both channels. This enables one to adjust and maintain the sensitivity of the two channels of the automatic ranger so that it is equal over large phase shifts of the echo signal more readily than it is the case in connection with Fig. 3 where the signals produced by the two time-discriminating networks are of an asymmetric nature and require special adjustment of the time-discriminating networks, biasing potentials, and the output circuits, for producing the desired equal sensitivity.

The advantages of the automatic systems described in this specification may be summarized as follows: They enable one to operate the radio object-locating systems with a greater degree of precision than the precision that is obtainable when the systems of this kind are operated manually. The systems may be very readily connected and disconnected from the radio object-locating systems without disrupting their normal functioning cycle either before or after the disconnection of the automatic systems. All circuits are of entirely electronic nature which use vacuum tubes and the only mechanical elements that are used by the systems relate to the driving equipment. Therefore, the circuits may be adjusted to a high degree of precision which will be maintained throughout the normal functioning cycle and life of the equipment. In the vacuum tube circuits that were devised for accomplishing the desired results it was necessary to introduce a plurality of signals of video type which are apt to introduce undesirable disturbances on the output side of the circuits. The presence of such disturbances is avoided in the circuits described in the specification by converting the video echo signal into a high frequency signal, and by using tuned circuits on the output side which present a low impedance path for the auxiliary signals avoiding in this manner their transmission to the succeeding circuits. Moreover, the precision of the equipment as well as of the entire radio object-locating system has been increased by providing an automatic volume control circuit which is controlled only by the selected echo signal.

It should be understood that while I have shown simple triodes in some parts of the schematic diagrams, in actual practice the tubes may have a larger number of elements and may be replaced with pentodes or other multiple electrode tubes having greater efficiency when used with the high frequency pulses here contemplated. Moreover, while I have shown the torque amplifying means as comprising a reversible-direct current motor connected to a constant current supply and its field winding connected to the output of the differential bridge circuit, there are now available several other types of torque amplifiers known by the trade names "Amplidyne," "Westodyne" and other torque amplifying means equally suitable for accomplishing the contemplated results.

In the description of the automatic ranging systems illustrated in Figs. 1 to 4 and 7, the time-discriminating networks were shown connected to the same channel which is used for generating an echo selecting pulse so that the same rectangular pulse which is used for selecting the desired echo signal is used for producing the time-discriminating signals. An obvious modification of this arrangement resides in the separation of these two channels so that two independent channels are used for accomplishing the heretofore outlined purposes. In the suggested modification these channels are connected to the output of phase shifter 34, Fig. 1, and two independent phase shifters (corresponding to phase shifter 30, Fig. 1) and two independent pulse shaping networks (corresponding to network 42, Fig. 1) are used for independent co-phasing the echo selecting pulse generator channel and the time-discriminating channel with the receiver. The advantages of this arrangement reside in the fact it is now possible to cophase the automatic tracker and the automatic ranger independent of each other.

It is believed that the construction and operation of my automatic system as well as the many advantages thereof will be apparent from the foregoing description. It will therefore be apparent that while I have shown and described my invention in several preferred forms, many changes and modifications may be made without departing from the spirit of the invention, as sought to be defined in the following claims.

I claim:

1. A radio pulse echo object locating system comprising a synchronizing oscillator, a phase shifter connected to said oscillator, a receiver, means connected to said receiver and to said phase shifter for selecting the echo corresponding to objects at a pretermined range, an automatic ranging means comprising two parallel channels connected to said selecting means, a time discriminating circuit connected to said ranging means for generating two pulses one with continuously decreasing amplitude and the other with continuously increasing amplitude during a time interval longer than but including the selected echo, means to impress one of said pulses on one of said channels and the other pulse on the other channel whereby any shift in phase of the desired echo with respect to said pulses renders one of said channels more conductive and the other channel less conductive, said selecting means comprising a network for transforming a sinusoidal wave generated by said oscillator into a series of rectangular pulses of approximately thrice the duration of said echo and in synchronism with said desired echo, a high frequency oscillator, a first modulator connected to said high frequency oscillator and said network, said rectangular pulses rendering said first modulator conductive for the high frequency impressed upon it by said oscillator, and a second modulator connected to said first modulator and to said receiver, means for rendering said second modulator conductive for the high frequency signal impressed upon it by said first modulator when the desired echo coincides in phase with said high frequency signal impressed upon it by said first modulator.

2. A radio pulse echo object locating system capable of comparing the magnitude of components of a pulse echo derived through separate receiving channels, means for suppressing all echoes except those arriving at a predetermined time corresponding to the range of the selected object, comprising a rectangular pulse generator, an oscillator, a first normally blocked modulator connected on its input side to said oscillator and to said rectangular pulse generator, said rectangular pulse generator rendering said first modulator conductive for the frequency impressed upon it by said first oscillator, a second modulator connected to said first modulator and to said channels, the output of said channels rendering said second modulator conductive for said frequency to select only that echo which coincides in time with the signal impressed upon it by said first modulator, means for converting said desired echoes to alternating current signals of predetermined frequency, means for separating the components of said alternating current signals in accordance with the separate channels from which the desired echoes controlling such components were derived, and means for comparing the amplitudes of said components derived through the respective channels.

3. A radio pulse echo object locating system for locating objects in accordance with echoes reflected therefrom, a two lobe antenna array, a receiver having two input channels each of said input channels being connected to the output circuits of one of said antenna lobes, means for generating an echo selecting pulse, a high frequency oscillator, a first modulator converting said echo selecting pulse into a high frequency pulse, a normally blocked second modulator connected to the output of said first modulator and to the output of said receiver, said second modulator suppressing all but that echo which coincides with said high frequency pulse, means connected to said second modulator for separating the components of said echo in accordance with the separate receiver input channels from which they were derived, means for comparing the magnitude of said separate components comprising a differential bridge circuit responsive only to the difference in the magnitudes of said separate components, a meter connected across said bridge and to indicate the degree and direction of deviation of said antenna array from its on-object position, motor controlling means connected across said bridge and mechanical connections between the motor controlled by such means and the antenna array, whereby said antenna array is oriented by said motor to make equal the magnitudes of said separate components.

4. In a radio pulse echo object locating system, a synchronizing oscillator, a receiving antenna array having two lobes of directivity corresponding to two output channels, a receiver connected to said channels, a lobe switching unit for alternately connecting said receiver to said channels, and an output circuit connected to said receiver, said output circuit comprising means for converting only the echoes arriving at a time corresponding to the distance of a desired object into a signal of predetermined frequency, including an echo selecting pulse generator connected to said synchronizing oscillator to transform the sinusoidal wave generated by said synchronizing oscillator into a series of rectangular pulses which coincide in time with the desired echo, and a source of high frequency keyed by said pulses, and further controlled by the output of said receiver, means for separating the components of said high frequency signals controlled by said echoes in accordance with the output channels from which they were received, and means for indicating on-object position of said antenna array.

5. In a radio pulse echo object locating system, a receiver, means for generating two sinusoidal voltages in synchronism with the reception of echoes from a selected range, means for modulating the receiver output due to echoes from objects near said selected range with each of said sinusoidal voltages, and means responsive to the difference of the modulated echoes to modify the phase of said sinusoidal voltages to correspond to changes in the range of the selected object.

EDWIN K. STODOLA.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 1,997,991 | Barden | Apr. 16, 1935 |
| 2,063,534 | Wallace | Dec. 8, 1936 |
| 2,189,549 | Hershberger | Feb. 6, 1940 |
| 2,226,366 | Braden | Dec. 24, 1940 |
| 2,231,929 | Lyman | Feb. 18, 1941 |
| 2,290,771 | Shepard | July 21, 1942 |
| 2,316,044 | Blair | Apr. 6, 1943 |
| 2,403,975 | Graham | July 16, 1946 |
| 2,404,712 | Hollingsworth | July 23, 1946 |
| 2,408,821 | Stearns | Oct. 8, 1946 |
| 2,409,448 | Rost et al. | Oct. 15, 1946 |
| 2,409,462 | Zworykin et al. | Oct. 15, 1946 |
| 2,416,088 | Deerhake | Feb. 18, 1947 |
| 2,422,074 | Bond | June 10, 1947 |
| 2,423,644 | Evans | July 8, 1947 |
| 2,427,029 | Stearns | Sept. 9, 1947 |
| 2,433,667 | Hollingsworth | Dec. 30, 1947 |
| 2,434,273 | Ketchledge | Jan. 13, 1948 |
| 2,446,850 | Root | Aug. 10, 1948 |
| 2,455,265 | Norgaard | Nov. 30, 1948 |
| 2,455,673 | Hansell | Dec. 7, 1948 |
| 2,481,515 | Isbister | Sept. 13, 1949 |

FOREIGN PATENTS

| Number | Country | Date |
| --- | --- | --- |
| 542,634 | Great Britain | Jan. 21, 1942 |